United States Patent
Demirdjioghlou et al.

[15] 3,668,698
[45] June 6, 1972

[54] CAPACITIVE TRANSDUCER

[72] Inventors: Sayman Fadil Demirdjioghlou, Ottawa; Robert Maarten Van Dyk, Dunrobin, Ontario, both of Canada

[73] Assignee: Northern Electric Company Limited, Montreal, Quebec, Canada

[22] Filed: Dec. 17, 1970

[21] Appl. No.: 99,108

[52] U.S. Cl..................................340/365, 317/101 B
[51] Int. Cl..........................................G08c 9/02
[58] Field of Search....................................340/365

[56] References Cited

UNITED STATES PATENTS 3,293,640  12/1966  Chalfin..................................340/365
3,308,253  3/1967  Krakinowski..........................340/365

OTHER PUBLICATIONS

IBM Tech Disclosure Bull. Vol. 12 No. 7 p. 1053, 1054, Dec 1969– Moore

Primary Examiner—Thomas B. Habecker
Attorney—John E. Mowle

[57] ABSTRACT

A capacitive transducer, for a contactless switch, which utilizes an electret sandwiched between two conductors, one of which is a conductive elastomer. Depression of the conductive elastomer produces a voltage pulse across the two conductors which is utilized to turn on a field-effect transistor, thus providing a low impedance path for the switch.

9 Claims, 10 Drawing Figures

INVENTORS
S. F. DEMIRDJIOGHLOU
R. M. VAN DYK

BY John E. Mowle
PATENT AGENT

INVENTORS
S. F. DEMIRDJIOGHLOU
R. M. VAN DYK

BY John E. Mowle
PATENT AGENT

CAPACITIVE TRANSDUCER

FIELD OF THE INVENTION

This invention relates to a capacitive transducer and more particularly to one which may form part of a contactless push-button switch.

DESCRIPTION OF THE PRIOR ART

Push-button switches are used in many applications such as push-button telephones, typewriters and calculating machines. In the past, the majority of these applications required low impedance connections thus necessitating the use of metal-to-metal contacts. These contacts were, by their very nature, subject to failure resulting from pitting, corrosion and/or dust etc.

Recently, particularly due to the advances in solid-state switching devices, numerous contactless push-button switches have been developed. In general, some form of variable impedance element is used to control a solid-state switch, the output of which provides a relatively low impedance connection. In one form, the variable impedance element utilizes the change in ohmic resistance of a field plate due to a magnetic field passing therethrough. In still another, the Hall effect, due to the change in flux density of an external magnetic field, is used to generate a voltage which in turn triggers the solid-state switch. Still another type utilizes a strain-sensitive semiconductor film having a high piezo-resistive characteristic. While many of the above switches provide long-life reliability, they are complex and hence, expensive.

SUMMARY OF THE INVENTION

It has been discovered that a very reliable and yet economical contactless push-button switch can be produced utilizing a novel capacitive transducer in which the change in capacity across a charged dielectric generates a signal voltage which can be used to actuate a solid-state switch.

Thus, in accordance with the present invention, the basic capacitive transducer comprises a conductive base contact having a charged dielectric film in juxtaposition therewith. The transducer also comprises a manually depressable contact, such as a conductive elastomer adjacent to the other side of the film so that upon its depression towards the film, the change in capacitance therebetween results in a voltage pulse.

While conductive elastomers have been used in previous applications for contacting switches, they suffer from the disadvantage that the resistance of the contact varies with the applied pressure on the switch, primarily due to the high resistivity of the material. However, in the present application, where a voltage pulse is produced due to a change in capacitance, the resistivity of the conductive elastomer has little or no effect on the pulse amplitude and hence is not critical.

In a preferred embodiment of the invention, the capacitive transducer forms part of a contactless switch, in which the output voltage pulse is fed to the gate and source electrodes of a field-effect transistor. Depression of the conductive elastomer results in a voltage pulse which, when applied to the field-effect transistor, substantially reduces the impedance between its source and drain electrodes to provide the switching action.

A load and a source of operating voltage can be serially connected between the source and drain electrodes of the field-effect transistor to produce a voltage pulse thereacross. Due to leakage buildup, both depression and release of the conductive elastomer may result in voltage pulses of opposite polarity across the field-effect transistor.

In applications where a single voltage pulse is required upon depression or release of the conductive elastomer, a diode can be connected between the gate and source electrodes. Depending upon the polarity of the diode, the voltage pulse will be generated either during depression or release of the conductive elastomer. The diode also serves to stabilize the switch by inserting a high impedance (due to its back-biased resistance) in shunt with the input to the field-effect transistor. This reduces the R-C time constant of the switch which protects it against excessive electro-static charges, and on release provides a fast recovery path for charges that were displaced during actuation. If both positive and negative pulses are desired, this stabilization can be achieved by utilizing a pair of back-to-back diodes.

In preferred embodiments, the dielectric film is an electret thus eliminating the necessity for a separate voltage source across the film to maintain the electrical charge. Additionally, the conductive elastomer is composed of conductive silicone rubber.

The amount of depression of the conductive elastomer required to produce a satisfactory voltage pulse is relatively small. Hence, in order to provide greater movement so as to avoid erroneous operation of such a transducer, a still more preferred embodiment of the invention utilizes a push-button, and a helical spring disposed between the button and the conductive elastomer. Actuation of the push-button compresses the spring which in turn depresses the elastomer to produce the voltage pulse as hereinbefore explained.

By arranging a plurality of transducers in a matrix and utilizing a plurality of base contacts beneath each section, the present invention can be readily utilized in such applications as push-button telephones, typewriters and calculating machines.

BRIEF DESCRIPTION OF THE DRAWINGS

Example embodiments of the invention will now be described with reference to the accompanying drawings in which.

DESCRIPTION OF THE PREFERRED EMBODIMENTS

Figure 1:
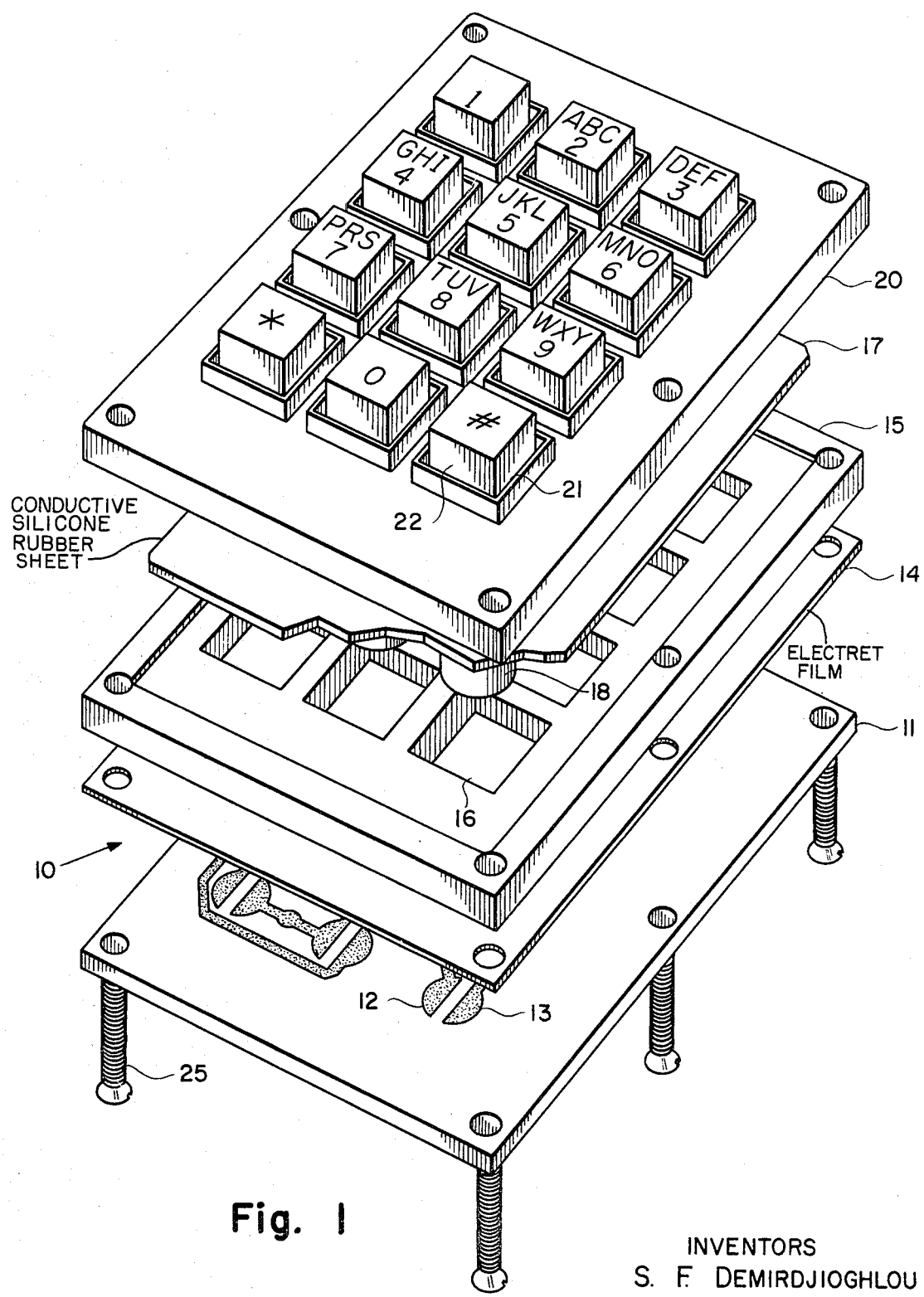
FIG. 1 is an exploded view of a push-button keyboard utilizing a plurality of capacitive transducers in accordance with the present invention.

Referring to FIG. 1, the push-button keyboard comprises a three by four matrix of capacitive transducers which are basically the same. In the following description the elements of only one transducer will be identified by a single reference numeral which is typical of the elements in each transducer. It will be understood that these reference numerals inferentially designate the elements in each of the other capacitive transducers.

Figure 2:
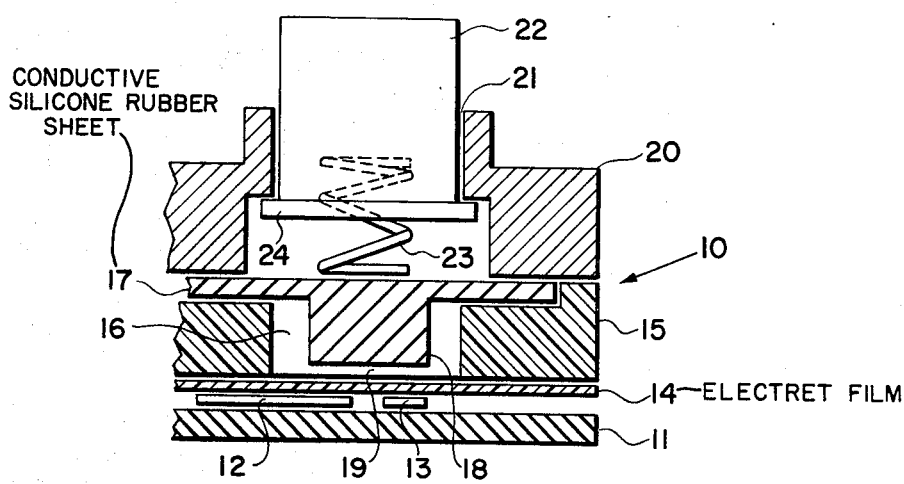
FIG. 2 is a cross-sectional view of the capacitive transducers illustrated in FIG. 1.

Referring to FIGS. 1 and 2, the push-button keyboard comprises a plurality of capacitive transducers, generally 10, each comprising a section of a printed circuit board 11 on which there are formed horizontal and vertical conductive base contacts 12 and 13 which are interconnected in a well known manner to form an x-y matrix. Electrical connections to the contacts 12 and 13 can be made from the back of the printed circuit board 11 by inserting wires (not shown) through the board 11 and soldering them to the contacts 12 and 13 in a well known manner. ALternately, the connections can be made by conductive land portions (not shown) brought to the outer edges of the printed circuit board 11 for suitable connection to associated circuitry.

Overlying the printed circuit board 11 is a charged dielectric in the form of an electret film 14. Overlying the electret film 14 is an insulated frame 15 having a plurality of holes 16 centered over each of the pairs of horizontal and vertical conductive base contacts 12 and 13. A manually depressable contact or conductive elastomer in the form of a flexible conductive silicone rubber sheet 17 is recessed into the frame 15. The sheet 17 has a plurality of protrusions 18 which extend through the holes 16 so that they are adjacent to but not touching the electret film 14 thus forming an air gap 19 between the two. This completes the basic capacitive transducer 10.

Overlying the conductive silicone rubber sheet 17 is a conductive frame 20, one side of which makes contact with the conductive silicone rubber sheet 17. The conductive frame 20 has a plurality of holes 21 which are aligned with the holes 16. A push-button 22 is mounted in each of the holes 21. A helical spring 23 is mounted between each push-button 22 and the conductive silicone rubber sheet 17 so as to continually urge the button 22 upwards. However, the push-button 22 is restricted from travelling beyond its quiescent position by the lips 24 thereon. The various elements of the transducers 10 are held together by screws 25 which pass through the aligned holes and are threaded into the conductive frame 20. This also enables electrical contact to be made from the back of the unit through the screws 25 and the conductive frame 20 to the conductive silicone rubber sheet 17.

It is possible to eliminate both the push-button 22 and the helical spring 23 and actuate each capacitive transducer 10 by depressing the conductive silicone rubber sheet 17 directly. However, the additional travel required to actuate the capacitive transducer 10 by depression of the push-button 22 and the helical spring 23 closely simulates the characteristics of a conventional push-button assembly and additionally tends to eliminate erroneous actuation of the contactless switch.

While various materials may be used for the electret film 14, it is found that good results are obtained if it is made of one-half mil tetrafluoroethylene which is sold under the trademark Teflon. The electret film 14 may be charged using any one of a number of known charging methods. One such method is disclosed in "Thermal Currents from Corona-Charged Mylar" by Robert A. Creswell and Martin M. Perlman; "Journal of Applied Physics," Vol. 41, No. 6, pp 2,365–2,375, May 1970.

The total charge on the electret film 14 is determined by its surface charge density. This is usually measured by determining the equivalent bias voltage required to neutralize the electrostatic field across the air gap 19. The relationship between the two is as follows:

$$\sigma = K\epsilon_o V_b/d$$

where:
 $\sigma$ = surface charge density;
 K = dielectric constant;
 $\epsilon_0$ = permittivity of free space;
 $V_b$ = equivalent bias voltage; and
 d = thickness of the electret film 14.

In a typical embodiment, the electret film 14 is charged to an equivalent bias voltage of 25 volts although bias voltages of about 10 to 15 volts are sufficient for contactless switch applications. The low charge on the electret film 14 prevents arc discharge when the conductive silicone rubber sheet 17 touches the electret film 14.

Figure 3:
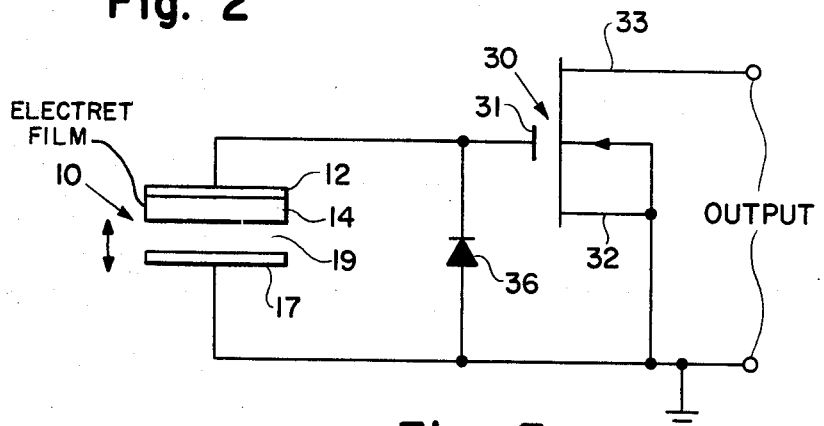
FIG. 3 is a schematic circuit diagram of a contactless switch utilizing a capacitive transducer illustrated in FIGS. 1 and 2.

FIG. 3 is a schematic circuit diagram illustrating the capacitive transducer 10 being utilized as part of a typical contactless switch. The switch also comprises a MOS (metal-oxide-semiconductor) field-effect transistor 30 having its gate electrode 31 connected to the conductive base contacts 12 in one row. The source electrode 32 of the field-effect transistor 30 is connected to the conductive silicone rubber sheet 17 and to ground. Output from the switch is obtained between the drain electrode 33 of the field-effect transistor 30 and ground. A diode 36 is connected between the gate electrode 31 and ground.

In a complete x–y matrix, the three conductive base contacts 12 of each row and the four conductive base contacts 13 of each column are connected to each other. Each of the groups of contacts 12 or 13 is connected to one of seven MOS field-effect transistors 30 as described above with reference to FIG. 3.

In operation, depression of the push-button 22 compresses the helical spring 23. This, in turn, depresses the flexible conductive silicone rubber sheet 17. As a result, the air gap 19 between the sheet 17 and the dielectric film 14 is decreased thereby increasing the capacitance between the sheet 17 and the conductive base contact 12. The conductive rubber sheet 17 acts as a spring because of its resiliency. In addition, it functions as a common ground electrode, a dust seal and an electrical shield for each of the capacitive transducers 10. Because the sheet 17 is clamped between the insulated frame 15 and the conductive frame 20, each transducer 10 may be actuated independently by the push-buttons 22.

Figure 4A:
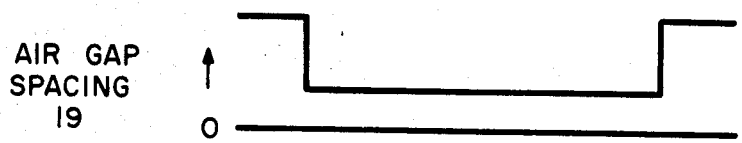
FIGS. 4A, 4B, 4C, 4D, 4E and 4F, are various waveforms relating to the operating characteristics of the capacitive transducers illustrated in FIGS. 1 and 2.
Figure 4B:

Referring to FIGS. 3 and 4A to 4F, displacement of the conductive rubber sheet 17 decreases the air gap 19 between it and the dielectric film 14. The operation of each capacitive transducer 10 relies on the rate of change of capacitance in a long time-constant circuit. FIG. 4A illustrates a sudden decrease in the spacing of the air gap 19 which results in an increase in the capacitance as shown in FIG. 4B. Before actuation, the capacitance of one row or column of the matrix is about 15 picofarads. After the push-button 22 is depressed, this increases to about 30 picofarads. From the formula $Q = C.V$, it is evident that an increase in the capacitance C disturbs the equilibrium of the charge Q. Current must therefore flow in such a manner as to bring about a charge distribution that makes the electrostatic voltage V across the air gap 19 equal to that across the electret film 14.

Figure 4C:
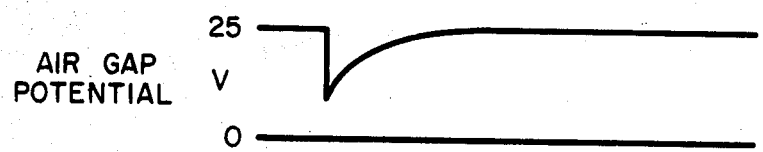
Figure 4D:
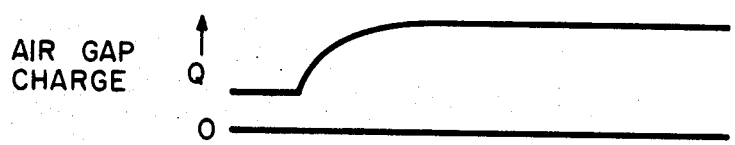

Due to the large R-C time constant, an interval of time is required before equilibrium is restored. Initially, the voltage across the air gap 19 decreases as shown in FIG. 4C. As current flows around the circuit through the diode 36, the charge across the air gap 19 increases exponentially as shown in FIG. 4D until equilibrium is restored.

Figure 4E:
Figure 4F:

The current flowing through the leakage resistance of the diode 36 generates a voltage pulse between the gate and source electrodes 31 and 32 as shown in FIG. 4E. This turns the field-effect transistor 30 hard on so that the impedance between its source and drain electrodes 32 and 33 drops sharply to less than a few hundred ohms as shown in FIG. 4F. This provides the desired switching action across the output thus enabling either direct-current or alternating-current signals to be switched. To provide a sufficiently long R-C time constant, the reverse impedance of the diode is selected to be at least $2 \times 10^9$ ohms. In some applications it may be advantageous to utilize a Zener diode in place of the diode 36, in order to limit the amplitude of the voltage pulse applied to the MOS field-effect transistor 30.

On release of the push-button 22, the flexible conductive silicone rubber sheet 17 returns to its quiescent state and the capacitance is decreased as shown in FIG. 4B. This time however the inequilibrium causes forward conduction of the diode 36. As a result, the charge Q drops suddenly as shown in FIG. 4D so that no voltage pulse appears between the gate and source electrodes 31 and 32.

If both positive and negative voltage pulses are required, a high leakage impedance may be obtained in both directions by utilizing a pair of back-to-back diodes in place of the diode 36.

In practice, an interval of time is required to depress the push-button 22 and hence alter the spacing as shown in FIG. 4A. As a result, the capacitance does not vary instantaneously as shown in the hypothetical case of FIG. 4B. However, by selecting components so that a sufficiently long R-C time constant is obtained, the voltage pulse generated across the diode 36 will be sufficient to turn on the MOS field-effect transistor 30 for several seconds.

In a similar manner to that described above, actuation of the push-button 22 also generates a voltage pulse between the conductive base contact 13 and the conductive silicone rubber sheet 17. Utilizing a separate circuit similar to that shown in FIG. 3, two separate switching functions can be performed. This readily enables the control of two separate tone generators as conventionally used in push-button dialling. By utilizing additional conductive base contacts, any number of contactless switches can be controlled. Thus, the basic capacitive transducer 10 may be utilized as part of a contactless switch in more complex applications such as a typewriter keyboard or a calculating machine.

Figure 5:
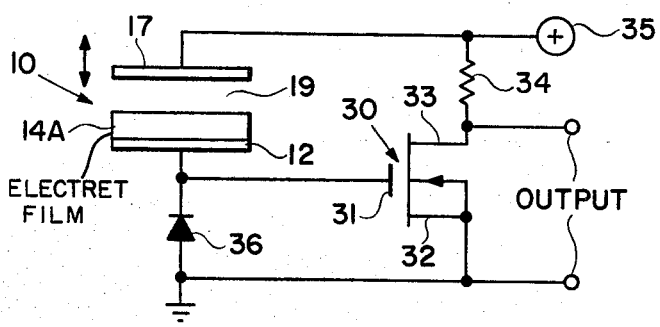
FIG. 5, illustrated on the same sheet as FIGS. 2 and 3, is a schematic circuit diagram of a modified contactless switch utilizing a capacitive transducer similar to that illustrated in FIGS. 1 and 2.

In an alternate embodiment of the invention, the electret film 14 may be replaced by a simple dielectric and the charge provided from an external source. A contactless switch utilizing this arrangement is shown in FIG. 5 in which the various components perform basically the same functions as those shown in FIG. 3 with the exception of the dielectric film 14A which replaces the electret film 14. In addition, the drain electrode 33 is connected to one end of a resistive load 34, and a source of operating voltage 35 is connected between the other end of the load 34 and ground.

In this embodiment, the capacitive transducer 10 is charged through the leakage resistance of the diode 36 from the source 35. Depression of the conductive rubber sheet 17 increases the capacitance resulting in an inequilibrium in charge distribution. Current must therefore flow in such a way as to bring about a charge distribution so that the voltage across the dielectric film 14A is again equal to the voltage from the source 35. The resulting current flow generates a voltage pulse which appears across the diode 36 so as to turn on the field-effect transistor 30 until equilibrium is restored. The decreased impedance across the field-effect transistor 30 causes the voltage across the output to drop resulting in a voltage pulse thereacross.

Upon release, the conductive rubber sheet 17 returns to its unoperated position thereby reducing the capacitance across the air gap 19. Again current flows to restore equilibrium. However, this time the diode 36 conducts in its forward direction thus resulting in a very short time constant. As a result, no voltage pulse appears across the diode 36.

WHAT IS CLAIMED IS:

1. A capacitive transducer, for a contactless switch, comprising:
    a conductive base contact;
    an electret film having one surface in juxtaposition with said conductive base contact; and
    a conductive elastomer sheet means in juxtaposition with the other surface of the electret film, said conductive elastomer sheet means being flexible in a direction relative to the conductive base contact to alter capacitance therebetween so as to produce a voltage pulse thereacross.

2. A capacitive transducer as defined in claim 1 in which the conductive elastomer sheet means is composed of conductive silicone rubber.

3. A contactless switch comprising a capacitive transducer as defined in claim 1 and further comprising:
    a field-effect transistor having gate, source and drain electrodes; the gate and source electrodes being connected in shunt with the conductive base contact and the conductive elastomer sheet means.

4. A contactless switch as defined in claim 3 further comprising a diode connected between the gate and source electrodes.

5. A contactless switch as defined in claim 3 further comprising a push-button, and a spring disposed between the push-button and the conductive elastomer sheet means, the push-button being moveable to compress the spring and thereby to depress the conductive elastomer sheet means towards the conductive base contact.

6. A capacitive transducer, for a contactless switch, comprising:
    a printed circuit board having at least one conductive contact on one side thereof;
    an electret film having one surface in juxtaposition with said one side;
    an insulated frame having one side disposed on the other surface of said electret film;
    a sheet of conductive elastomer positioned on the other side of said frame, said sheet having at least one protrusion extending through said frame in juxtaposition with said film and opposed said one conductive contact; and
    said sheet being depressable to displace said protrusion towards the electret film to increase the capacitance between the conductive contact and the sheet, so as to produce a voltage pulse thereacross due to the electrical charge on the electret film.

7. A capacitive transducer as defined in claim 6 which further comprises a push-button, and a spring disposed between the push-button and the side of the sheet opposite said protrusion, said push-button being moveable to compress the spring and thereby displace said protrusion towards said electret film.

8. A contactless switch comprising a capacitive transducer as defined in claim 6 and further comprising:
    a field-effect transistor having gate, source and drain electrodes, the gate and source electrodes being connected in shunt with the conductive base contact and the sheet of conductive elastomer.

9. A contactless switch as defined in claim 8 further comprising:
    a diode connected between the gate and source electrodes.

* * * * *